United States Patent
Pandurangarao et al.

(10) Patent No.: US 12,192,273 B1
(45) Date of Patent: Jan. 7, 2025

(54) SYSTEMS AND METHODS FOR AUTOMATED APPLICATION DEPLOYMENT

(71) Applicant: Allstate Insurance Company, Northbrook, IL (US)

(72) Inventors: Anil Kumar Pandurangarao, Buffalo Grove, IL (US); Kannan Saravanan, Bangalore KA (IN); Jotom Chiramel, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/594,265

(22) Filed: Oct. 7, 2019

(51) Int. Cl.
*H04L 67/1021* (2022.01)
*G06F 8/61* (2018.01)
*H04L 67/00* (2022.01)
*H04L 67/1097* (2022.01)

(52) U.S. Cl.
CPC ........... *H04L 67/1021* (2013.01); *G06F 8/61* (2013.01); *H04L 67/1097* (2013.01); *H04L 67/34* (2013.01)

(58) Field of Classification Search
CPC . H04L 67/1021; H04L 67/1097; H04L 67/34; G06F 8/61
See application file for complete search history.

(56) References Cited

U.S. PATENT DOCUMENTS

| | | | |
|---|---|---|---|
| 7,370,318 B1 | 5/2008 | Howe et al. | |
| 7,865,888 B1 * | 1/2011 | Qureshi | G06F 11/079 717/168 |
| 8,578,348 B2 | 11/2013 | Fliess et al. | |
| 8,739,150 B2 | 5/2014 | Gass et al. | |
| 9,558,441 B2 | 1/2017 | Bachelor et al. | |
| 9,654,599 B1 * | 5/2017 | Wheeler | G06F 8/65 |

(Continued)

FOREIGN PATENT DOCUMENTS

WO 2012021324 A2 2/2012

OTHER PUBLICATIONS

Young-Woo Kwon et al, Cloud Refactoring: Automated Transitioning to Cloud-Based Services, Automated Software Engineering Manuscript, Dept. of Computer Science, Virginia Tech, Blacksburg, VA, Oct. 8, 2013.

(Continued)

*Primary Examiner* — Michael A Keller
*Assistant Examiner* — Timothy Sowa
(74) *Attorney, Agent, or Firm* — Dinsmore & Shohl LLP

(57) ABSTRACT

Systems and methods in accordance with embodiments of the invention can analyze a variety of software applications, modify the software applications, and/or automatically deploy the software applications to a distributed computing system. Distributed computing systems can provide software applications in a scalable, low cost manner that can be dynamically scaled to demand. Software deployment systems in accordance with embodiments of the invention can automatically process software applications to determine the suitability of the software application to be deployed to a distributed computing system and/or modify the software application for deployment. A variety of machine classifiers can be used to score various aspects of a software application to identify portions of the application for modification and/or suitability for deployment.

19 Claims, 6 Drawing Sheets

(56) References Cited

U.S. PATENT DOCUMENTS

| | | | |
|---|---|---|---|
| 9,767,006 B2 | 9/2017 | Krajec et al. | |
| 9,830,149 B2 | 11/2017 | Abadi et al. | |
| 9,836,332 B2 | 12/2017 | Syed et al. | |
| 9,870,223 B2 | 1/2018 | Bofferding et al. | |
| 10,007,515 B2 | 6/2018 | Subramanian et al. | |
| 10,061,573 B2 | 8/2018 | Araya et al. | |
| 10,154,091 B1* | 12/2018 | Flaherty | H04L 41/0806 |
| 10,162,610 B2 | 12/2018 | Apte et al. | |
| 10,169,029 B2 | 1/2019 | Borley et al. | |
| 10,198,250 B1 | 2/2019 | Sharma et al. | |
| 10,250,461 B2 | 4/2019 | Amendjian et al. | |
| 10,678,785 B1* | 6/2020 | Anderson | G06F 16/2433 |
| 2008/0040455 A1* | 2/2008 | MacLeod | G06F 8/61 709/220 |
| 2014/0258374 A1* | 9/2014 | Suryanarayanan | H04L 67/1021 709/203 |
| 2014/0282456 A1 | 9/2014 | Drost et al. | |
| 2015/0378765 A1* | 12/2015 | Singh | G06F 9/50 718/1 |
| 2016/0036724 A1 | 2/2016 | Syed et al. | |
| 2017/0201569 A1* | 7/2017 | Fu | G06F 9/45558 |
| 2017/0207980 A1* | 7/2017 | Hudis | H04L 41/145 |
| 2017/0257432 A1* | 9/2017 | Fu | H04L 67/2823 |
| 2017/0286080 A1* | 10/2017 | Krishnamoorthy | G06F 8/65 |
| 2017/0344344 A1* | 11/2017 | Gass | G06F 8/61 |
| 2018/0060065 A1* | 3/2018 | Lai | G06F 8/71 |
| 2019/0018671 A1 | 1/2019 | Zhu et al. | |
| 2019/0050319 A1* | 2/2019 | Gondalia | G06F 11/3664 |
| 2019/0065165 A1* | 2/2019 | Troutman | H04L 67/10 |
| 2019/0073200 A1* | 3/2019 | Sunarno | G06F 8/60 |
| 2019/0129712 A1* | 5/2019 | Hawrylo | G06F 8/71 |
| 2019/0163547 A1* | 5/2019 | Ampabathina | G06F 8/60 |
| 2019/0171438 A1* | 6/2019 | Franchitti | G06F 16/9538 |
| 2019/0235850 A1* | 8/2019 | Mukherjee | G06F 8/65 |
| 2019/0312800 A1* | 10/2019 | Schibler | H04L 41/0823 |
| 2020/0004518 A1* | 1/2020 | Ryall | G06F 8/65 |
| 2020/0133651 A1* | 4/2020 | Holzer | G06F 8/33 |
| 2020/0265134 A1* | 8/2020 | Cristina | G06F 8/60 |
| 2020/0322809 A1* | 10/2020 | Zhao | H04W 24/02 |
| 2021/0019141 A1* | 1/2021 | Marsnik | G06N 7/01 |

OTHER PUBLICATIONS

Successful Cloud Migration in 3 Easy Steps, https://newrelic.com/resource/cloud-migration-in-3-easy-steps-guide, May 3, 2018.

100% Automated Architecture-Driven Documentation, Transformation, & Refactoring of Applications, https://tsri.com/, May 23, 2019.

Shailesh Gogate, Why Refactor an App? We have Rehosted App on Cloud, https://cloudhedge.io/why-refactor-an-app-we-have-rehosted-app-on-cloud/, Oct. 23, 2018.

Khadija Sabiri et al, Methods Migration from On-premise to Cloud, IOSR Journal of Computer Engineering (IOSR-JCE), e-ISSN: 2278-0661,p-ISSN: 2278-8727, vol. 17, Issue 2, Ver. IV (Mar.-Apr. 2015), pp. 58-65, www.iosrjournals.org.

Justin Spears, A Guide to Migrating Applications to the Cloud, https://blog.netapp.com/a-guide-to-migrating-application-to-the-cloud/, Jun. 25, 2018.

\* cited by examiner

SYSTEMS AND METHODS FOR AUTOMATED APPLICATION DEPLOYMENT

FIELD OF USE

Aspects of the invention relate to application development and more specifically to the modification of software applications.

BACKGROUND

Computer software is a collection of data or computer instructions that cause a computer to perform one or more functions. Functions can include processing a variety of data for a variety of purposes. Computer software is typically designed to execute on a single computer with dedicated computing resources, such as a processor, memory, and local storage.

Cloud computing is the on-demand availability of computing resources that can be shared by one or more virtual machines executing in the cloud computing environment. Cloud computing environments typically include multiple geographically distributed data centers. If the connection to the user is relatively close, it can be designated an edge server. Certain computer software written for legacy computing systems may not perform properly (or at all) when executing in a cloud computing environment. Systems and methods in accordance with embodiments of the invention overcome these problems by analyzing software applications, modifying the software applications, and/or automatically deploying the software applications.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can analyze a variety of software applications, modify the software applications, and/or automatically deploy the software applications to a distributed computing system. Distributed computing systems can provide software applications in a low cost manner that can be dynamically scaled to demand. Software deployment systems in accordance with embodiments of the invention can automatically process software applications to determine the suitability of the software application to be deployed to a distributed computing system and/or modify the software application for deployment.

Software deployment systems can collect information regarding one or more software applications and determine one or more features within the software applications that are desirable for deployment of the software application to a distributed computing system. Based on the features of the software application, one or more deployment strategies can be recommended. Machine classifiers can be used to generate scores and/or probabilistic likelihoods that a software application is suitable for a particular deployment strategy. The deployment strategies can also include indications of modifications to the software application that would make the software application more suitable for deployment on a distributed computing system. In a variety of embodiments, the software deployment system can automatically modify the software application to make it more suitable for a particular deployment strategy. In a number of embodiments, a deployment strategy can include a set of recommended modifications that can automatically be provided to client devices to facilitate the modification of the software application and/or source code of the software application. In several embodiments, the software deployment system automatically initializes a computing environment on the distributed computing system and deploys the software application to the computing environment. The computing environment can execute the software application and provide access to the software application to a variety of computing devices.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
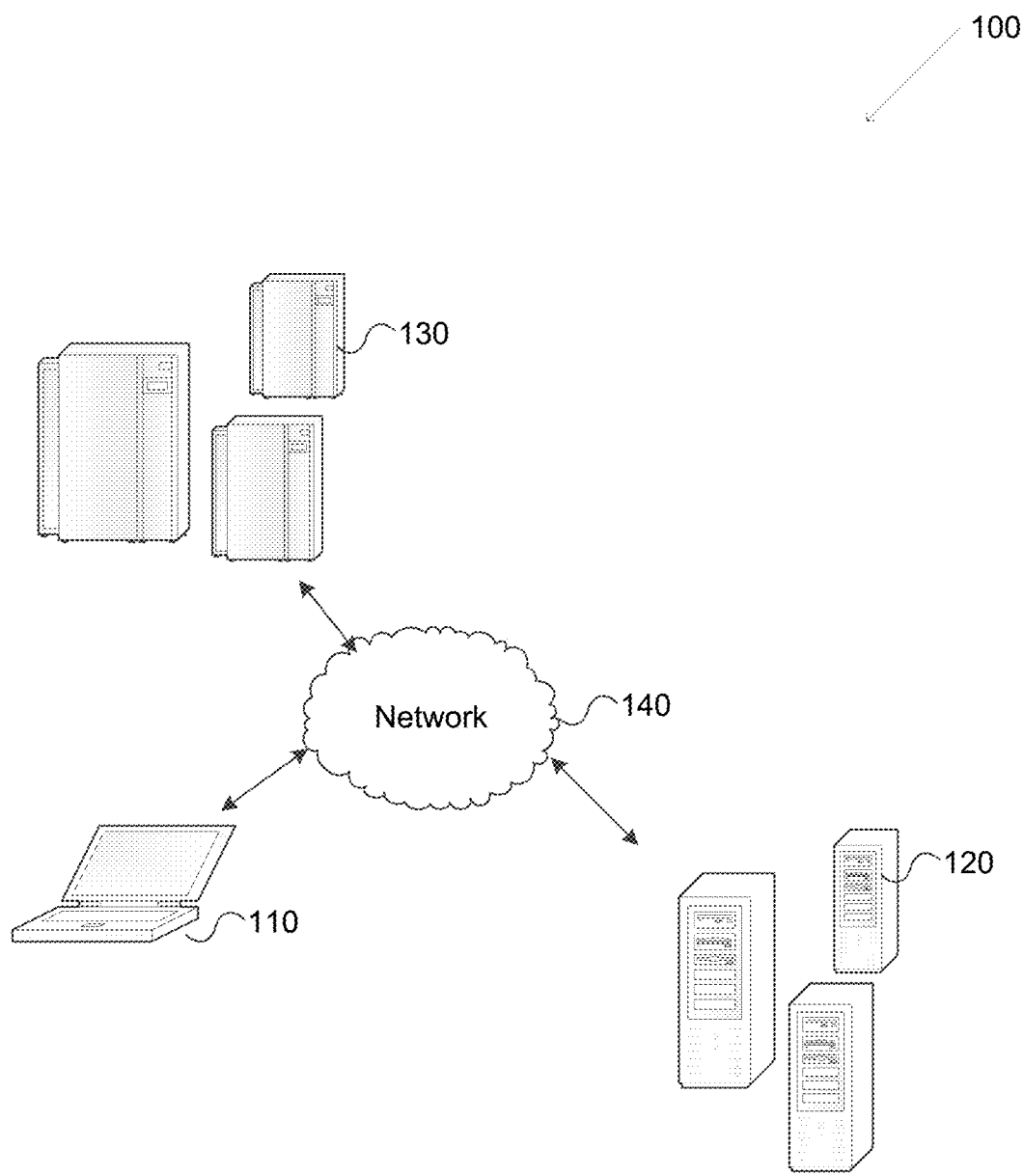
FIG. 1 illustrates an example operating environment in which one or more aspects described herein can be implemented.

In the following description of the various embodiments, reference is made to the accompanying drawings, which form a part hereof, and in which is shown by way of illustration, various embodiments of the disclosure that can be practiced. It is to be understood that other embodiments can be utilized.

Aspects described herein relate to determining the suitability of software applications to be deployed to a distributed computing system, deploying software applications to the distributed computing system, and/or modifying software applications for deployment to the distributed computing system. Distributed computing systems can provide computing environments that allow for the execution of software applications and provide access to the software application to a variety of computing devices. In several embodiments, computing environments can be dynamically created and/or scaled based on demand. Software deployment systems in accordance with embodiments of the invention can automatically process software applications to determine the suitability of the software application to be deployed to a distributed computing system and/or modify the software application for deployment. In a number of embodiments, a deployment strategy can include a set of recommended modifications that can automatically be provided to client devices to facilitate the modification of the software application and/or source code of the software application. Software deployment systems can collect information regarding one or more software applications and determine one or more features within the software applications that are suitable and/or unsuitable for deployment of the software application to a distributed computing system. Based on the features of the software application, one or more deployment strategies can be recommended. Machine classifiers can be used to generate scores and/or probabilistic likelihoods that a software application is suitable for a particular deployment strategy. The deployment strategies can also include indications of modifications to the software application that would make the software application more suitable for deployment on a distributed computing system. In a variety of embodiments, the software deployment system can automatically modify the software application to make it more suitable for a particular deployment strategy. In a number of embodiments, a deployment strategy can include a set of recommended modifications that can automatically be provided to client devices to facilitate the modification of the software application and/or source code of the software application. In several embodiments, the software deployment system automatically initializes a computing environment on the distributed computing system and deploys the software application to the computing environment.

These and various other arrangements will be described more fully herein. As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Software Deployment Systems and Computing Devices

FIG. 1 illustrates a software deployment system 100 in accordance with an embodiment of the invention. The software deployment system 100 includes at least one client device 110, at least one software deployment server system 120, and/or at least one distributed computing system 130 in communication via a network 140. Any of the devices and systems described herein can be implemented, in whole or in part, using one or more computing devices described with respect to FIG. 2.

Client devices 110 can allow for users to determine deployment strategies for software applications and/or deploy software applications as described herein. Software deployment server systems 120 can obtain software applications and/or analyze the software applications to determine one or more deployment strategies. In several embodiments, software deployment server systems 120 can also automatically modify software applications and/or deploy software applications to one or more distributed computing systems. In a number of embodiments, software deployment server systems 120 can automatically provide instructions to client devices to facilitate the modification of the software application and/or source code of the software application. Distributed computing systems 130 can provide computing environments to execute and provide access to one or more software applications executing within the computing environment. The network 140 can include a local area network (LAN), a wide area network (WAN), a wireless telecommunications network, and/or any other communication network or combination thereof.

A distributed computing system can be provided by a service provider and can include one or more processing nodes. A processing node includes the underlying physical hardware (e.g. processor, memory, storage devices, and the like) to host one or more computing environments executing on top of the physical hardware. The processing nodes can be geographically distributed and/or can be grouped into availability zones. Each availability zone can include one or more processing nodes in a particular geographic region. In this way, the distributed computing system can provide a common service in a variety of geographic regions. When one or more processing nodes in a first availability zone (e.g. geographic region) experience a period of unavailability (such as due to network outages, performance issues, and/or underlying hardware failures), requests to the distributed computing system in the first availability zone can be rerouted to processing nodes in a second, geographically distinct, availability zone. In this way, the distributed computing system provides reliable, robust service that is fault-tolerant and resilient against outages in a particular geographic region. A distributed computing system can also provide a variety of management devices and/or shared memory pools, such as an in-memory data grid, that are accessible by one or more of the processing nodes. The management devices can be used to control the performance of computing environments, including creating computing environments, modifying the operation and/or resource allocation of computing environments, and/or destroying computing environments. Shared memory pools can be used to store data accessible by one or more computing environments executing within the distributed computing system. Distributed computing systems can be provided by a variety of service providers in the same geographic region, overlapping geographic regions, and/or distinct geographic regions.

The data transferred to and from various devices in a software deployment system 100 can include secure and sensitive data. Therefore, it can be desirable to protect transmissions of such data using secure network protocols and encryption, and also to protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/ or Pretty Good Privacy (PGP) encryption. In many embodiments, one or more web services can be implemented within the various computing devices. Web services can be accessed by authorized external devices and users to support input, extraction, and manipulation of data between the various computing devices in the software deployment system 100. Web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the software deployment system 100 in front of one or more computing devices described herein such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX®, is presumed, and the various computing devices described herein can be configured to communicate using any of these network protocols or technologies.

Figure 2:
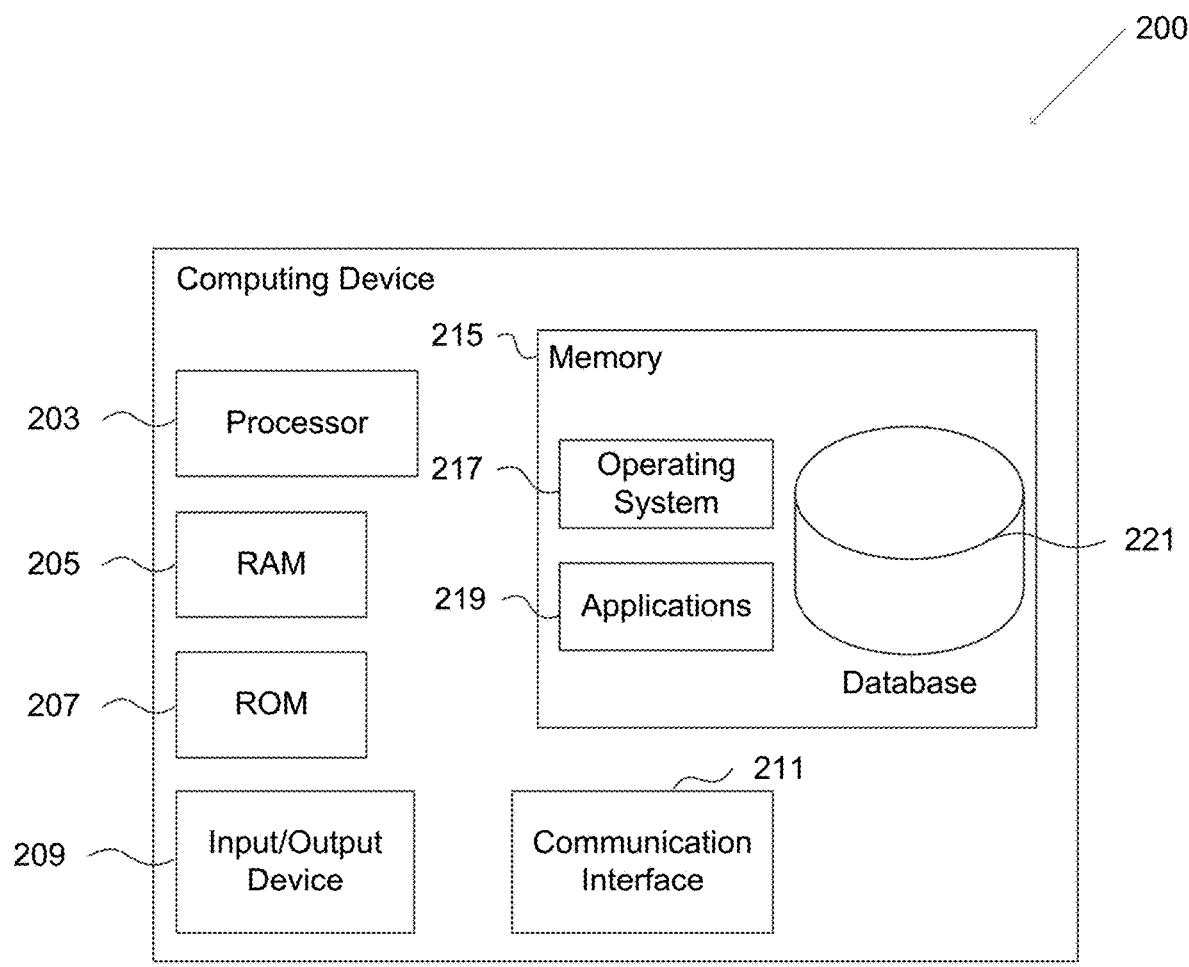
FIG. 2 illustrates one an example computing device in accordance with one or more aspects described herein.

Turning now to FIG. 2, a computing device 200 in accordance with an embodiment of the invention is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, input/output (I/O) device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium so long as it can be used to store the desired information and can be accessed by processor 203.

Communication interface 211 can include one or more transceivers, digital signal processors, and/or additional circuitry and software for communicating via any network, wired or wireless, using any protocol as described herein.

Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of software deployment systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Analyzing and Deploying Software Applications

Figure 3:
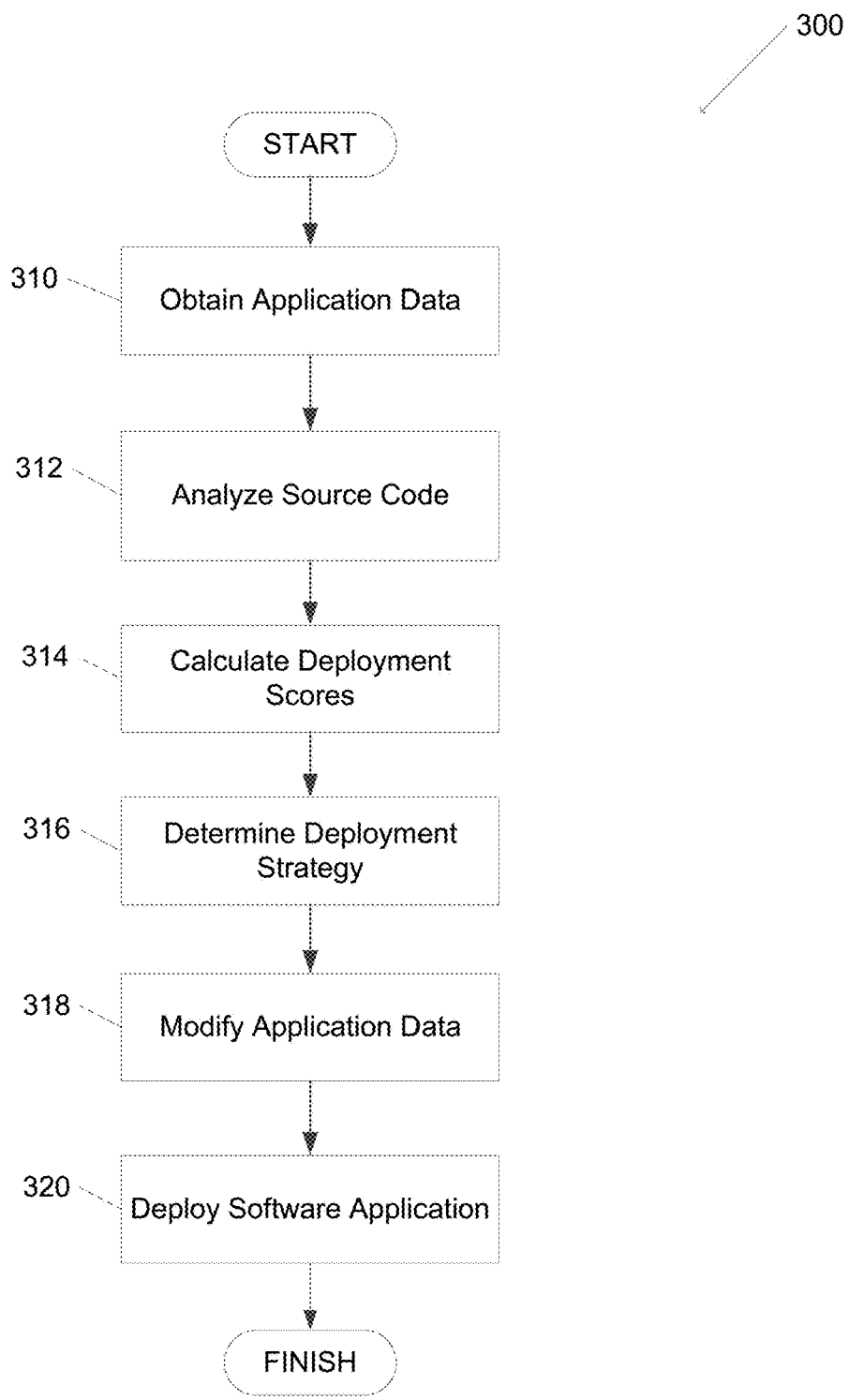
FIG. 3 is a flow chart illustrating a process for an application deployment in accordance with one or more aspects described herein.

FIG. 3 is a flow chart illustrating a process for an application deployment in accordance with one or more aspects described herein. Some or all of the steps of process 300 can be performed using any of the computing devices and/or combination thereof described herein. In a variety of embodiments, some or all of the steps described below can be combined and/or divided into sub-steps as appropriate.

At step 310, application data can be obtained. The application data can include source code, libraries, executable code, metadata, and/or any other artifacts of a software application. The source code can be compiled to generate the executable code and/or libraries, and the source code can reference one or more of the libraries. The executable code can be executed within a computing environment and can utilize one or more of the libraries. In several embodiments, the application data includes a legacy software application designed to execute outside of a distributed computing system. The metadata can include any of a variety of data, such as documentation, version information, localizations, and/or any other data related to the application data and/or data used in the configuration of the software application.

The software application can store a variety of data using any of a variety of storage systems, such as flat files, databases, and the like.

At step 312, source code can be analyzed. The source code can be analyzed to determine one or more features of the software application compiled based on the source code. In several embodiments, features in the source code include, but are not limited to, library dependencies in the source code, services provided by the software application, services consumed by the software application, data storage functions, the number of threads used in the execution of the software application, and/or the configuration used by the software application. Features of the source code can include functions utilized in the software application generated based on the source code and/or any associated libraries. In a variety of embodiments, analyzing the source code can include identifying particular functions within the source code that provide and/or are used by one or more features of the software application.

At step 314, one or more deployment scores can be calculated. A deployment score can include a score for one or more features identified in the source code and/or a probabilistic likelihood that modifying a particular feature would improve the overall suitability of the software application for deployment into a distributed computing system. A variety of factors can be considered in calculating the deployment score including, but not limited to, the analyzed source code, dependencies on external libraries, services consumed by the software application, the steps necessary to build, release, and run the software application, threads used by the software application, network ports used by the software application, concurrency of resources consumed by and/or provided by the software application, the disposability of the software application, parity between development environments and production environments, event log data generated by the software application, and/or administration processes involved with executing the software application. In a variety of embodiments, the deployment score can be determined based on one or more weighted scores for some or all of the features of the source code.

In several embodiments, the deployment score and/or probabilistic likelihood can be calculated using one or more machine classifiers. A variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

At step 316, a deployment strategy can be determined. The deployment strategy can indicate how the software application will be deployed (or not deployed) on a distributed computing system. Any of a variety of deployment strategies can be used, such as, but not limited to, rehosting, re-platforming, refactoring, re-architecting, retaining, and/or retiring the software application. Rehosting a software application can include migrating the software application to a distributed computing system with minimal to no changes to the application data for the software application. Replatforming a software application can include reinitializing a computing environment provided by a distributed computing system and modifying the application data for the software application based on the provided computing environment. Refactoring a software application can include modifying one or more functions of a software application, reducing resource contention, adding and/or removing library references, and the like to make the software application more compatible with execution within a computing environment provided by a distributed computing system. Rearchitecting, replacing, and/or repurchasing software application can include creating new software applications and/or porting some portions of the existing software application so that the new software application can be deployed to a distributed computing system. Retaining a software application can include maintaining the software application in its current state, including executing the software application outside of a distributed computing system. Retiring a software application can include decommissioning the software application with no migration to a distributed computing system.

Figure 4A:
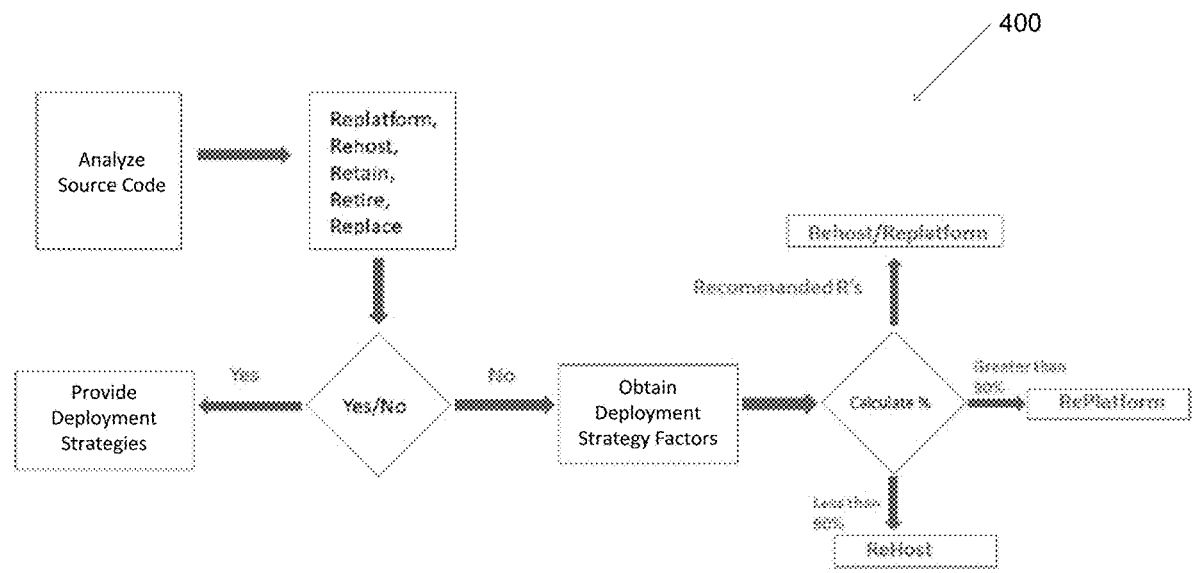
FIGS. 4A-B are flow charts illustrating potential deployment strategies in accordance with one or more aspects described herein.
Figure 4B:
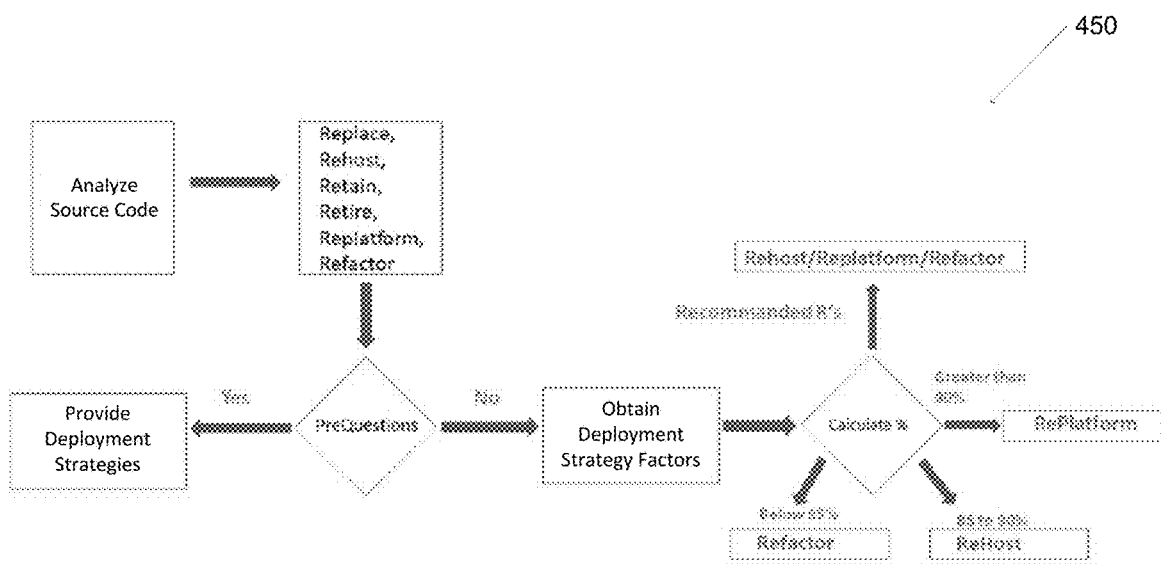

The deployment strategy can be determined based on the calculated deployment score(s). FIGS. 4A and 4B conceptually illustrate potential deployment strategies in accordance with one or more aspects of the disclosure. As shown in FIG. 4A, a deployment strategy 400 can be determined based on the score being within a particular range of a threshold score. An example, the deployment strategy for a software application can be a redeployment of the software application to a distributed computing system when the deployment score is greater than or equal to 0.9, while the deployment strategy can be to replatform the software application when the deployment score is less than 0.9. As shown in FIG. 4B, a deployment strategy 450 for a software application can be replatforming the software application to a distributed computing system when the deployment score is greater than or equal to 0.9, rehosting the software application when the deployment score is between 0.9 and 0.85, and refactoring the software application when the deployment score is less than 0.85. In several embodiments, the deployment scores are on a scale of zero to one, but any scoring techniques (including arbitrary scores) can be used. A variety of processes for determining a deployment strategy are described in more detail with respect to FIG. 5. In several embodiments, migration of data storage can be needed for deploying a software application in accordance with the deployment strategy.

At step 318, application data can be modified. The application data can be modified to make the generated software application more suitable for deployment to a distributed computing system. Modifying the application data can include refactoring one or more functions provided in the source code to improve concurrency, recompose functions into separate services, and the like. A variety of processes for modifying application data are described in more detail with respect to FIG. 6. The modifications to the application data can be indicated in the determined deployment strategy. In several embodiments, the modifications to the application data improve one or more scores of one or more features such that the overall deployment scores of the application data are more suitable for the determined deployment strategy.

At step 320, a software application can be deployed. In a variety of embodiments, deploying the software application can include installing and/or executing the software application within a computing environment provided by a distributed computing system. In several embodiments, the software application can be regenerated based on the updated application data prior to deployment. Deploying the software application can include initializing a computing environment on a distributed computing system. Initializing a computing environment can include, but is not limited to, allocating resources (e.g. processors, memory, storage space, and the like) to the computing environment, installing an operation system and/or storage system (e.g. a database management system) into the computing environment, loading existing data into the storage system, configuring access to the computing environment, and/or installing the software application. In many embodiments, initializing a computing environment includes setting up load balancers and/or scalers to dynamically manage the resources allocated to the computing environment. In a number of embodiments, a script can be generated that causes a management device provided by a distributed computing system to create one or more computing environments on one or more processing nodes of the distributed computing system. The one or more processing nodes can be located in one or more availability zones of the distributed computing system.

Figure 5:
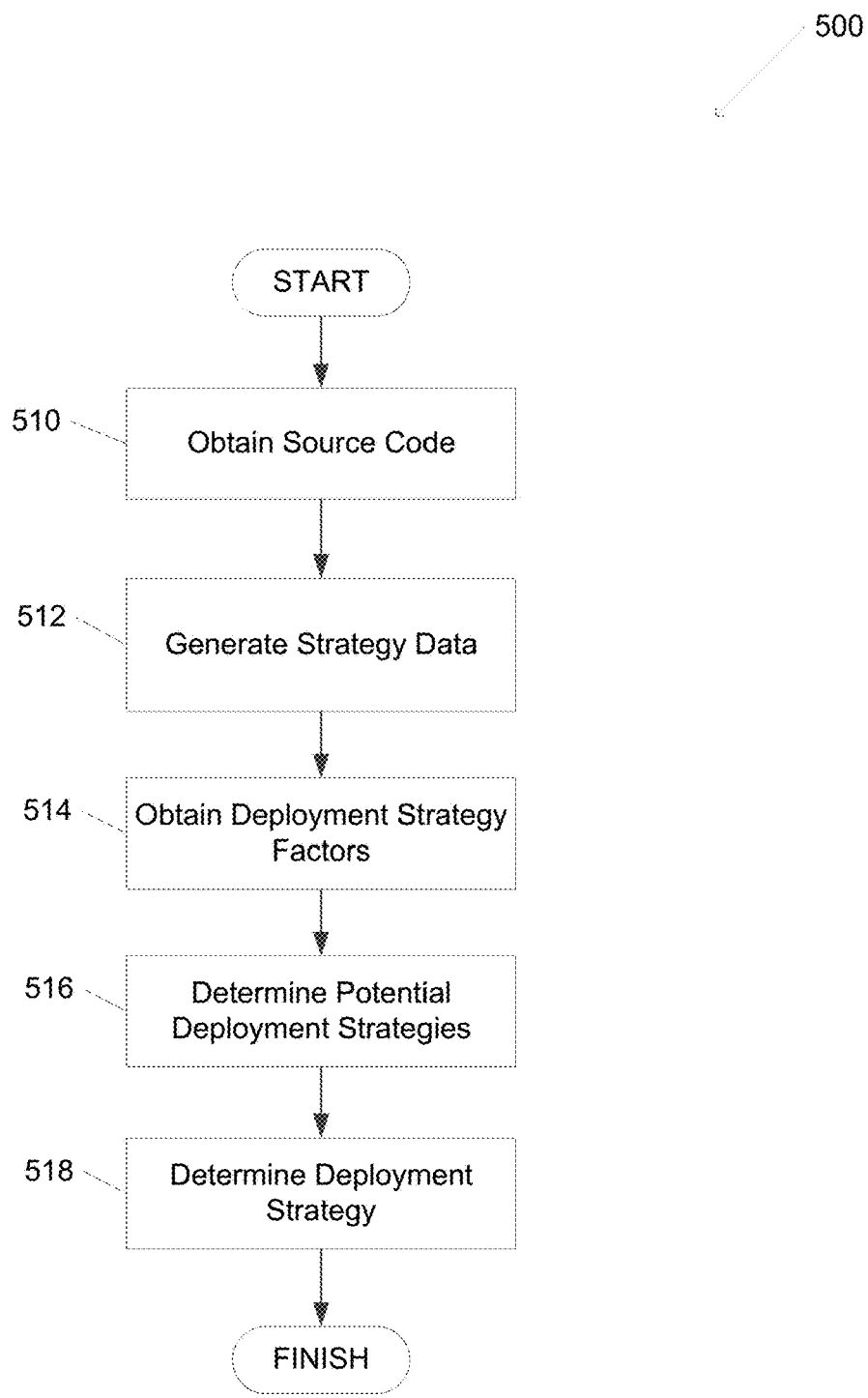
FIG. 5 is a flow chart illustrating a process for determining a deployment strategy in accordance with one or more aspects described herein.

FIG. 5 is a flow chart illustrating a process for determining a deployment strategy in accordance with one or more aspects described herein. Some or all of the steps of process 500 can be performed using any of the computing devices and/or combination thereof described herein. In a variety of embodiments, some or all of the steps described below can be combined and/or divided into sub-steps as appropriate.

At step 510, source code can be obtained. The source code can be associated with one or more libraries and/or software applications. The obtained source code can be compiled to generate the libraries and/or software application. The source code can reference one or more of libraries and compiling the software application can require access to the one or more libraries.

At step 512, strategy data can be generated. The strategy data can be automatically determined by analyzing the source code. The source code can be analyzed by determining a set of functions defined in the source code and determining properties of those functions. Properties of a function can include, but are not limited to, libraries referenced in the function, data consumed by the function, data provided by the function, threads invoked and/or destroyed by the function, concurrency of the function, calls to external resources and network usage, event log data generated by function, and the like.

At step 514, deployment strategy factors can be obtained. Deployment strategy factors can indicate a variety of features of the source code and/or application data associated with the source code. In several embodiments, the deployment strategy factors can be obtained from a client device. Deployment strategy factors can include, but are not limited to, codebase requirements, dependencies, configuration data, backing services, the delivery pipeline, how the application is deployed, network ports used, concurrency, disposability, parity between development and production environments, log data generation, and/or administrative requirements. Codebase requirements can include determining how many codebases (e.g. sets of source code) are needed to generate a particular software application. Dependency requirements can include determining if all dependencies are declared in the source code with no implicit reliance on operating system-specific tools or libraries. Configuration requirements can include determining if configuration data that is used to deploy the software application in a computing environment is dependent on the specific computing environment. When the configuration data is dependent on the computing environment, that configuration data should be stored in the computing environment. Backing service requirements can include determining if any backing services are treated as attached resources and attached and detached by the computing environment. Delivery pipeline requirements can include determining if the generation of the software application includes only building the software application using the source code, releasing the software application to the computing environment, and running the software application. Application deployment requirements can include determining if the software application is deployed as one or more stateless processes with persisted data stored on a backing service. Network requirements can include determining if the software application includes self-contained services made available to other services by specified network ports. Concurrency requirements can be determined based on individual processes provided by the software application being independently scalable. Disposability requirements can include determining if the software application can be easily started up and/or shut down, particular in conjunction with the creation and/or disposal of computing environments by a distributed computing system. Parity requirements can be determined based on the similarity of development environments to production environments. Logging requirements can include determining if the source code generates log data including event streams that can be aggregated by a computing environment. Administrative requirements can include determining if any administrative functions are packaged with the application data corresponding to the software application.

At step 516, potential deployment strategies can be determined. Any of a variety of deployment strategies such as, but not limited to, rehosting, re-platforming, refactoring, re-architecting, retaining, and/or retiring the software application can potentially be used. In several embodiments, a set of potential deployment strategies can be determined based on assessments of the source code and/or software application from one or more perspectives. Assessment perspectives can include, but are not limited to, application assessments, business assessments, technical assessments, financial assessments, security assessments, compliance and/or regulation assessments, and contractual assessments. Application assessments can include assessments made based on analyzing the source code. Business assessments can include assessments regarding how the software application is used and/or consumed within business operations. Technical assessments can include assessments made based on the obtained deployment strategy factors. Financial assessments can be made based on the costs associated with providing the software application. Security assessments can be made based on potential security vulnerabilities in the software application and/or sensitivity of the data stored and/or used by the software application. Compliance and regulatory assessments can include determining if the software application is impacted by any particular federal and/or state regulations. Contractual assessments can include determining if the software application is impacted by any relationships with third parties. Potential deployment strategies can include determining if the software application should be retained in its current deployment environment, be deployed on a publicly available distributed computing system, and/or be deployed on a private distributed computing system. The particular deployment environment indicated in a potential deployment strategy can be based on the assessment perspectives.

In a variety of embodiments, the assessment perspectives can include generating an assessment score and/or weight associated with the particular assessment perspective based on the source code and/or software application. In many embodiments, any of a variety of machine classifiers described herein can be used to automatically generate the assessment scores and/or weights. The weighted scores can be used to select one or more of the potential deployment strategies for the obtained source code and/or related software application.

At step 518, a deployment strategy can be determined. The determined deployment strategy can be based on the potential deployment strategies. In a variety of embodiments, the determined deployment strategy is based on the generated strategy data and the deployment strategy factors. In a number of embodiments, the deployment strategy is determined based on input data received using a client device. In many embodiments, the deployment strategy is determined based on one or more scores calculated, based on the requirements indicated in the deployment strategy factors, for some or all of the assessment perspectives for the deployment strategy. In several embodiments, the deployment strategy is determined based on a probabilistic likelihood of success of deployment of the software application as calculated by one or more machine classifiers. The machine classifiers can calculate the probabilistic likelihood of a software application being successfully deployed to a particular computing environment based on the generated strategy data and/or deployment strategy factors. In several embodiments, previously deployed software applications and the associated deployment strategy can be used to train the machine classifiers. In several embodiments, the determined deployment strategy is the potential deployment strategy with the highest score for the software application.

Figure 6:
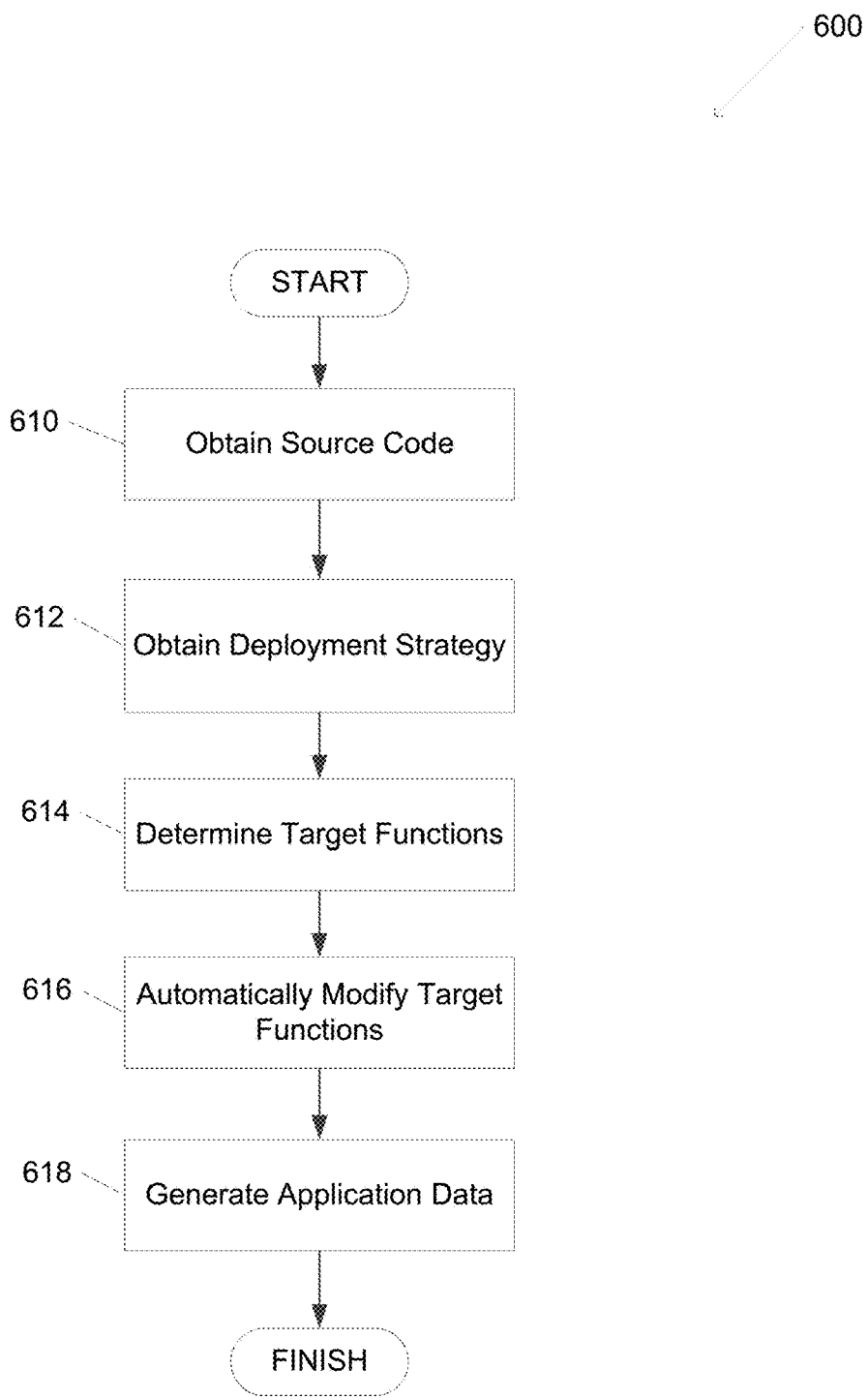
FIG. 6 is a flow chart illustrating a process for refactoring an application in accordance with one or more aspects described herein.

FIG. 6 is a flow chart illustrating a process for refactoring an application in accordance with one or more aspects described herein. Some or all of the steps of process 600 can be performed using any of the computing devices and/or combination thereof described herein. In a variety of embodiments, some or all of the steps described below can be combined and/or divided into sub-steps as appropriate.

At step 610, source code can be obtained. The source code can be obtained from a client device and/or any other computing device as described herein.

At step 612, a deployment strategy can be obtained. The obtained deployment strategy can include any of the deployment strategies as described herein. In several embodiments, the obtained deployment strategy indicates that one or more features of a software application need to be modified prior to deployment to a distributed computing system.

At step 614, target functions can be determined. The determined target functions can include functions defined in the source code corresponding to the features indicated in the deployment strategy. For example, if the deployment strategy indicates that a particular library referenced in the source code needs to be substituted for a new library, the target functions can include any function defined in the source code that references the particular library being substituted. In another example, the deployment strategy can include migrating from storing data using a flat file to storing data using a relational database and the target functions can include functions that write data to the flat file. In a third example, the deployment strategy can include adding logging functionality to the software application and the target functions can include functions in the source code that include error handling instructions.

At step 616, target functions can be automatically modified. Modifying a target function can include editing an existing function, generating a new function, deleting an existing function, merging existing functions, splitting an existing function into multiple functions, and the like. Returning to the first example, if an existing library reference is being replaced with a new library, modifying the target functions can include replacing the source code instructions that calls a function in the existing library with source code instructions that call a substitute function the new library. Returning to the second example, modifying the target function to write data to a relational database can include generating a query statement to insert data into the relational database and replacing instructions to write data to a flat file with instructions to provide the generated query statement to a relational database server system. Returning to the third example, adding logging functionality can include generating a new function that writes data to an event stream provided by a computing environment and modifying the target functions to include a call that provides the error data generated by the error handling instructions to the new function such that the error data is written to the event stream.

At step 618, application data can be generated. In several embodiments, the application data is generated by compiling the source code to generate executable code, libraries, metadata, and/or any other data as described herein. The application data can include the modifications made to the target functions to improve the suitability of the software application to be deployed on a distributed computing system. The generated application data can then be deployed as described herein.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules can be written in a source code programming language that is subsequently compiled for execution, or can be written in a scripting language such as (but not limited to) HTML or XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described above can be performed in alternative sequences and/or in parallel (e.g., on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
   obtaining, by a software deployment server system, source code for a software application;
   determining, by the software deployment server system, at least one feature in the source code;
   calculating, by the software deployment server system, at least one source code deployment score based on the at least one feature;
   determining, by the software deployment server system, a deployment strategy based on the at least one source code deployment score, wherein:
      the deployment strategy comprises replatforming when the at least one source code deployment score is above a scoring threshold for the source code,
      the deployment strategy comprises rehosting when the at least one source code deployment score is above the scoring threshold for the source code,
      the deployment strategy comprises rearchitechting when the at least one source code deployment score is below the scoring threshold for the source code, and
      the deployment strategy comprises a set of recommended modifications to the source code of the software application;
   deploying, by the software deployment server system, to a distributed computing system, the software application based on the deployment strategy, wherein the distributed computing system provides a computing environment capable of executing the software application generated based on the source code of the software application; and
   automatically initializing, by the software deployment server system, the computing environment, wherein initializing comprises dynamically managing an allocated set of resources of the computing environment with load balancers or scalers.

2. The method of claim 1, wherein deploying the software application based on the deployment strategy comprises:
   selecting, by the software deployment server system, a feature in the at least one feature based on the source code deployment score associated with the feature; and
   modifying, by the software deployment server system, the feature based, at least in part, on the set of recommended modifications.

3. The method of claim 2, wherein modifying the feature based, at least in part, on the set of recommended modifications comprises:
   transmitting, by the software deployment server system and to a client device, the set of recommended modifications to facilitate the modification of the source code by the client device.

4. The method of claim 1, wherein the distributed computing system comprises a set of geographically distributed processing nodes.

5. The method of claim 4, wherein the computing environment is created on at least two processing nodes in distinct geographic regions.

6. The method of claim 1, further comprising:
   determining, by the software deployment server system, strategy data by analyzing the source code, wherein the strategy data indicates at least one function present in the at least one feature;
   obtaining, by the software deployment server system, deployment strategy factors, wherein the deployment strategy factors comprise at least one requirement for the at least one function present in the at least one feature; and
   calculating, by the software deployment server system, the source code deployment score based on the strategy data and the deployment strategy factors.

7. The method of claim 1, further comprising:
   calculating, by the software deployment server system, the at least one source code deployment score based on the at least one feature by utilizing at least one machine classifier including at least one neural network.

8. A computing device, comprising:
   a processor; and
   memory storing instructions that, when executed by the one or more processors, cause the computing device to:
   obtain application data comprising source code;
   determine at least one feature in the source code of the application data;
   calculate at least one source code deployment score based on the at least one feature, wherein the at least one source code deployment score indicates a probabilistic likelihood that modifying the at least one feature would improve suitability of the application data for deployment in a distributed computing system;
   determine a deployment strategy based on the at least one source code deployment score, wherein the deployment strategy comprises replatforming when the at least one source code deployment score is above a scoring threshold for the source code and comprises rearchitechting when the at least one source code deployment score is below the scoring threshold for the source code;
   deploy, to the distributed computing system, by a software deployment server system, the application data comprising the source code based on the deployment strategy, wherein the distributed computing system provides a computing environment capable of executing a software application generated based on the source code of the application data; and
   automatically initializing, by the software deployment server system, the computing environment, wherein initializing comprises dynamically managing an allocated set of resources of the computing environment with load balancers and scalers.

9. The computing device of claim 8, wherein the instructions that, when executed by the one or more processors, further cause the computing device to:
   select a feature in the at least one feature based on the source code deployment score associated with the feature; and
   modify the feature.

10. The computing device of claim 9, wherein modifying the feature comprises:
    transmitting, to a client device, a set of recommended modifications to facilitate the modification of the source code by the client device.

11. The computing device of claim 9, wherein the instructions that, when executed by the one or more processors, further cause the computing device to:

generate, based on the modified feature, a software application; and
include the software application in the application data deployed to the distributed computing system.

12. The computing device of claim 8, wherein the distributed computing system comprises a set of geographically distributed processing nodes.

13. The computing device of claim 12, wherein the computing environment is created on at least two processing nodes in distinct geographic regions.

14. The computing device of claim 8, wherein the instructions that, when executed by the one or more processors, further cause the computing device to:
   determine strategy data by analyzing the application data, wherein the strategy data indicates at least one function present in the at least one feature;
   obtain deployment strategy factors, wherein the deployment strategy factors comprise at least one requirement for the at least one function present in the at least one feature; and
   calculate the source code deployment score based on the strategy data and the deployment strategy factors.

15. A non-transitory machine-readable medium storing instructions that, when executed by one or more processors, cause the one or more processors to perform steps comprising:
   obtaining source code for a software application;
   determining at least one feature in the source code;
   calculating at least one deployment score for the source code based on the at least one feature;
   determining a deployment strategy based on the at least one deployment score, wherein:
      the deployment strategy comprises deployment when the at least one deployment score is above a threshold,
      the deployment strategy comprises rearchitechting when the at least one source code deployment score is below the scoring threshold for the source code, and
      the deployment strategy comprises a set of recommended modifications to the source code of the software application;
   deploying, to a distributed computing system, by a software deployment server system, the software application based on the deployment strategy when the at least one deployment score is above the threshold, wherein the distributed computing system provides a computing environment capable of executing the software application generated based on the source code of the software application;
   retiring the software application when the at least one deployment score is below the threshold; and
   automatically initializing, by the software deployment server system, the computing environment, wherein initializing comprises dynamically managing an allocated set of resources of the computing environment with load balancers or scalers.

16. The non-transitory machine-readable medium of claim 15, wherein deploying the software application based on the deployment strategy comprises:
   selecting a feature in the at least one feature based on the deployment score associated with the feature; and
   modifying the feature based, at least in part, on the set of recommended modifications.

17. The non-transitory machine-readable medium of claim 16, wherein modifying the feature based, at least in part, on the set of recommended modifications comprises:
   transmitting, to a client device, the set of recommended modifications to facilitate the modification of the source code by the client device.

18. The non-transitory machine-readable medium of claim 15, wherein:
   the distributed computing system comprises a set of geographically distributed processing nodes; and
   the computing environment is provided by at least one processing node in the set of geographically distributed processing nodes.

19. The non-transitory machine-readable medium of claim 15, wherein the instructions, when executed by the one or more processors, further cause the one or more processors to perform steps comprising:
   determining strategy data by analyzing the source code, wherein the strategy data indicates at least one function present in the at least one feature;
   obtaining deployment strategy factors, wherein the deployment strategy factors comprise at least one requirement for the at least one function present in the at least one feature; and
   calculating the deployment score.

\* \* \* \* \*